(12) United States Patent
Kim et al.

(10) Patent No.: US 7,167,691 B2
(45) Date of Patent: Jan. 23, 2007

(54) TRANSMISSION DIVERSITY METHOD IN MOBILE COMMUNICATION SYSTEM

(75) Inventors: Ki Jun Kim, Seoul (KR); Jee Woong Seol, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 10/744,083

(22) Filed: Dec. 24, 2003

(65) Prior Publication Data

US 2004/0166805 A1 Aug. 26, 2004

(30) Foreign Application Priority Data

Dec. 26, 2002 (KR) .................. 10-2002-0084438

(51) Int. Cl.
*H03C 7/02* (2006.01)
*H04B 1/02* (2006.01)

(52) U.S. Cl. .................... 455/101; 455/276.1

(58) Field of Classification Search ............ 455/101, 455/127.1, 25, 19, 276.1, 269, 275, 103, 455/108, 500, 522, 127.2, 42, 279.1; 375/299, 375/267

See application file for complete search history.

(56) References Cited

U.S. PATENT DOCUMENTS

| 6,584,161 B2 * | 6/2003 | Hottinen et al. ............. 375/299 |
| 2003/0108087 A1 * | 6/2003 | Shperling et al. ........... 375/146 |
| 2003/0109282 A1 * | 6/2003 | Shperling et al. ............. 455/42 |
| 2004/0072546 A1 * | 4/2004 | Sugar et al. ............. 455/127.1 |
| 2005/0013239 A1 * | 1/2005 | Agrawal et al. ............ 370/329 |
| 2005/0215202 A1 * | 9/2005 | Sugar et al. ................ 455/500 |

* cited by examiner

*Primary Examiner*—Aung Moe
(74) *Attorney, Agent, or Firm*—Fleshner & Kim LLP.

(57) ABSTRACT

Disclosed is a transmission diversity method in a mobile communication system, by which optimal transmission diversity can be provided in case that a base station of the mobile communication system uses at least one transmitting antenna. The present invention includes the step of having a transmitting side transmit signals using a plurality of antennas wherein a transmission signal of a second antenna differs from a transmission signal of a first antenna in a predetermined phase.

15 Claims, 4 Drawing Sheets

Instantaneous Rx Power/Average Rx Power [linear]

TRANSMISSION DIVERSITY METHOD IN MOBILE COMMUNICATION SYSTEM

This application claims the benefit of the Korean Application No. P2002-84438 filed on Dec. 26, 2002, which is hereby incorporated by reference.

BACKGROUND OF THE INVENTION

1. Field of the Invention

The present invention relates to a communication system, and more particularly, to a transmission diversity method in a mobile communication system, by which transmission diversity can be provided in case that a base station of the mobile communication system uses at least one transmitting antenna.

2. Discussion of the Related Art

Generally, a mobile communication system, e.g., 1xEV-DO (1x Evolution Data Optimized) system, supports a service of transmitting packets to a user through one packet data channel assigned by time-division.

A mobile terminal grasps a channel environment of a current forward link and converts channel information to receivable data rate information to transmit to a base station on a reverse data rate control channel.

The base station assigns resources of a forward packet data channel based on data rate control (DRC) information acquired from all mobile terminals and transmits packets to users through the assigned. In doing so, the base station maintains its maximum throughput using a scheduling algorithm to fairly distribute the packets to the respective mobile terminals.

However, specifications of a current mobile communication system consider a case of one transmitting antenna (tx antenna).

Namely, in case that at least one transmitting antenna (tx antenna) can be used in the base station, a method of acquiring transmission diversity is not taken into consideration. Hence, optimal transmission diversity needs to be studied in case that the base station uses at least one transmitting antenna.

SUMMARY OF THE INVENTION

Accordingly, the present invention is directed to a transmission diversity method in a mobile communication system that substantially obviates one or more problems due to limitations and disadvantages of the related art.

An object of the present invention is to provide a transmission diversity method in a mobile communication system, by which optimal transmission diversity can be provided in case that a base station of the mobile communication system uses at least one transmitting antenna.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, A transmission diversity method in a communication system, comprising the steps of presetting phase shifts of transmission signals using at least one transmitting antenna, and transmitting the transmission signals having its phase differs from one another.

Preferably, the phases of the transmission signals vary according to time t.

Preferably, the phase of a transmission signal using a first antenna and the phase of a transmission signal using a second antenna are phase-shifted with different variable cycles, respectively.

Preferably, the transmission signal of the second antenna is phase-shifted within a variation frequency of 5 Hz in contrast to the transmission signal of the first antenna.

Preferably, the phases of the transmission signals are variable for a time t.

Preferably, Preferably, in varying according to the time t, the phases of the transmission signals have different initial values, respectively. And a total strength of the transmission signals is set to equal to a transmission strength of a signal using one antenna.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
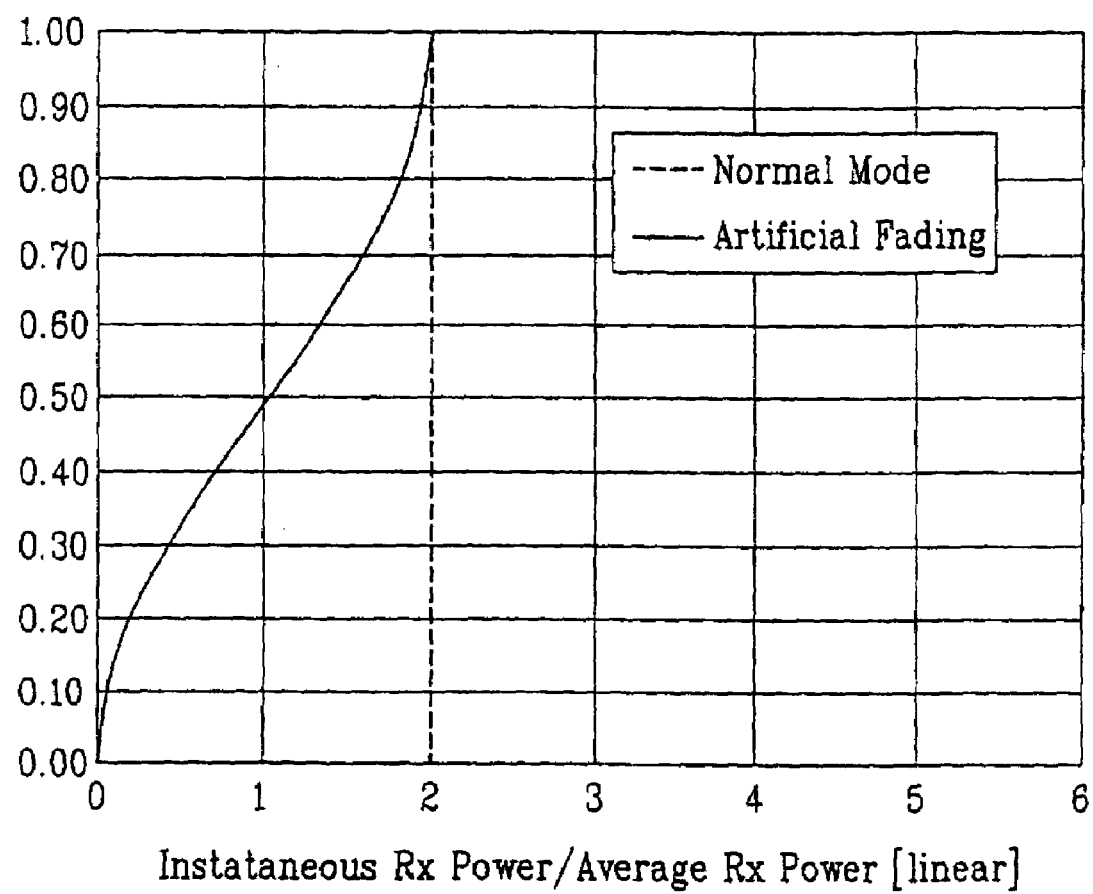
FIG. 1 is a graph of a cumulative distribution function on Gaussian channel in a related art and the present invention.

Reference will now be made in detail to the preferred embodiments of the present invention, examples of which are illustrated in the accompanying drawings. Wherever possible, the same reference numbers will be used throughout the drawings to refer to the same or like parts.

A transmission diversity method in a mobile communication system according to the present invention is explained as follows.

First of all, a data service system (1xEV-DO) in a mobile communication system provides a mobile terminal with a packet service using a proportional fair algorithm.

The proportional fair algorithm is explained as follows.

First of all, a priority function $P_i(k)$ for each mobile terminal i and time k is computed.

The mobile terminal i of the greatest Pi is scheduled.

$P_i(k)$ is scheduled by Equation 1.

$$P_i(k) = DPR_i(k)/T_i(k), \text{ wherein 'k' is a time in a slot,}$$
$$DPR_i(k) \text{ is a transmittable data rate from a}$$
$$\text{mobile terminal, and } T_i(k) \text{ is a fairness through-}$$
$$\text{put. [Equation 1]}$$

And, $T_i(k)$ is calculated in a following manner.

If the mobile terminal i is not scheduled at the time k−1, $T_i(k) = w \cdot T_i(k)$.

If the mobile terminal i is scheduled at the time k−1, Ti(k)=w·Ti(k−1)+(1−w)·Ni(k−1), wherein w=(window size)$^{-1}$[slot].

For reference, the fairness throughput is updated each slot, and does not directly coincide with a practical throughput.

And, Ni(k−1) is an information bit number of a packet transmitted through (K−1) slot. This is updated once at a first slot of a new packet.

In brief of the proportional fair algorithm, it can be seen by Equation 1 that it is serviced when the mobile terminal has the best channel status. Hence, as the number of the mobile terminals increases, the overall throughput of the base station increases since each of the mobile terminals is serviced in the best channel status.

Assuming that a transmission signal is s(t) in case of one antenna, $S(t)=a(t)e^{jw_0 t}$ (hereinafter $e^{jw_0 t}=\cos w_0 t + j \sin w_0 t$).

Assuming that transmission signals are $s_1(t)$ and $s_2(t)$ in case of two antennas, $s_1(t)=mt;epmrl;\sqrt{1/2}rlxmx\ a(t)e^{jw_0 t}$ and $s_2(t)=mt;epmrl;\sqrt{1/2}rlxmx\ a(t)e^{j(w_0 t+\theta)}$, where $w_0$ is a carrier frequency and θ is a phase shift and a time function varying according to time t.

In this case, a strength of the transmission signal in case of one antenna should be equal to a total strength of two transmission signals in case of two antennas. Hence, in order to meet $S_1^2(t)+s_2^2(t)=1$, a coefficient of a(t) of each of the transmission signals becomes $mt;epmrl;\sqrt{1/2}rlxmx$.

If there exist at least n antennas, the corresponding transmission signals are $s_1(t), s_2(t), \ldots, s_{n-1}(t)$, and $s_n(t)$.

Hence, $s_1(t)=K\ a(t)e^{jw_0 t}$, $s_2(t)=Ka(t)e^{j(w_0 t+\theta)}$, $s_2(t)=Ka(t)e^{jw_0 t+\theta_2}, \ldots$, and $s_n(t)=Ka(t)e^{jw_0 t+\theta_n}$, where a coefficient K of a(t) is determined to meet $S_1^2(t)+s_2^2(t)+\ldots+S_n^2(t)=1$.

And, shifted phases of signals in the respective transmission signals satisfy the following conditions.

1. $\theta_1 \neq \theta_2 \neq \ldots \neq \theta_n$.
2. θ in each transmission signal is a time function varying according to time (t) such as $\theta_1(t), \theta(t), \ldots$, and $\theta_n(t)$, and an initial value of θ differs from one another.
3. A variable period of a θ value in each transmission signal differs from one another. Namely, if the variable period of $\theta_1(t)$ of $s_1(t)$ is 5 Hz, each of a variable period of $\theta_2(t)$ of $S_2(t)$ and variable periods of other transmission signals is determined not to be 5 Hz.

In case of at least one antenna, a behavior of sensing a signal shifted by θ(t) brings about the same effect of generating one multi-path.

Thus, the behavior of generating the multi-path with one antenna is called 'artificial fading'.

For instance, when a base station transmits signals using a plurality of antennas (at least two antennas), in case that a value of θ(t) of a second antenna is varied slower than that of a first antenna (e.g., within a variation frequency of 5 Hz), a channel status is slowly changed to provide a good channel status so that a service can be provided at higher data rate.

Moreover, in case of using three or four antennas, it is able to provide a better service if the value of the θ(t) is varied slowly (with low variation Hz) (within variation frequency of 5 Hz).

Figure 2:
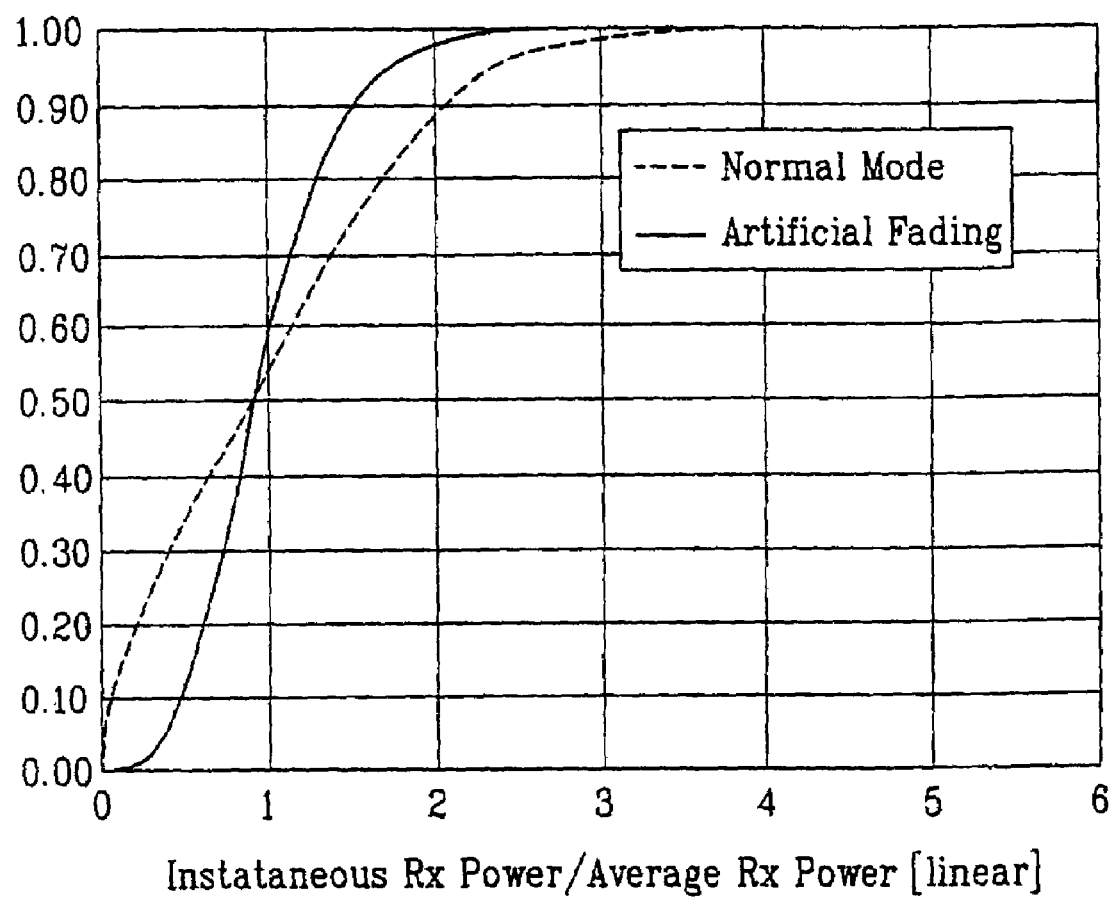
FIG. 2 is a graph of a cumulative distribution function on Rician channel in a related art and the present invention.
Figure 3:
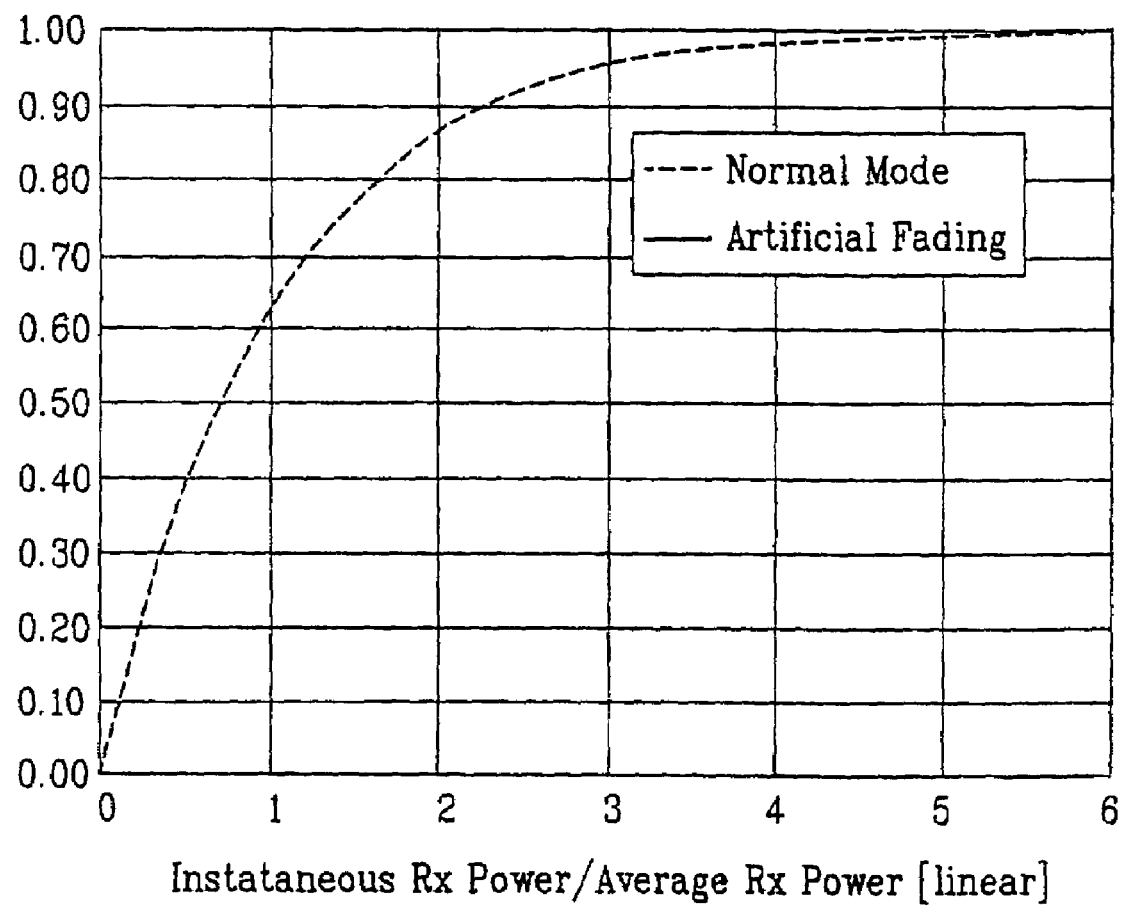
FIG. 3 and FIG. 4 are graphs of a cumulative distribution function on Rayleigh channel in a related art and the present invention.
Figure 4:
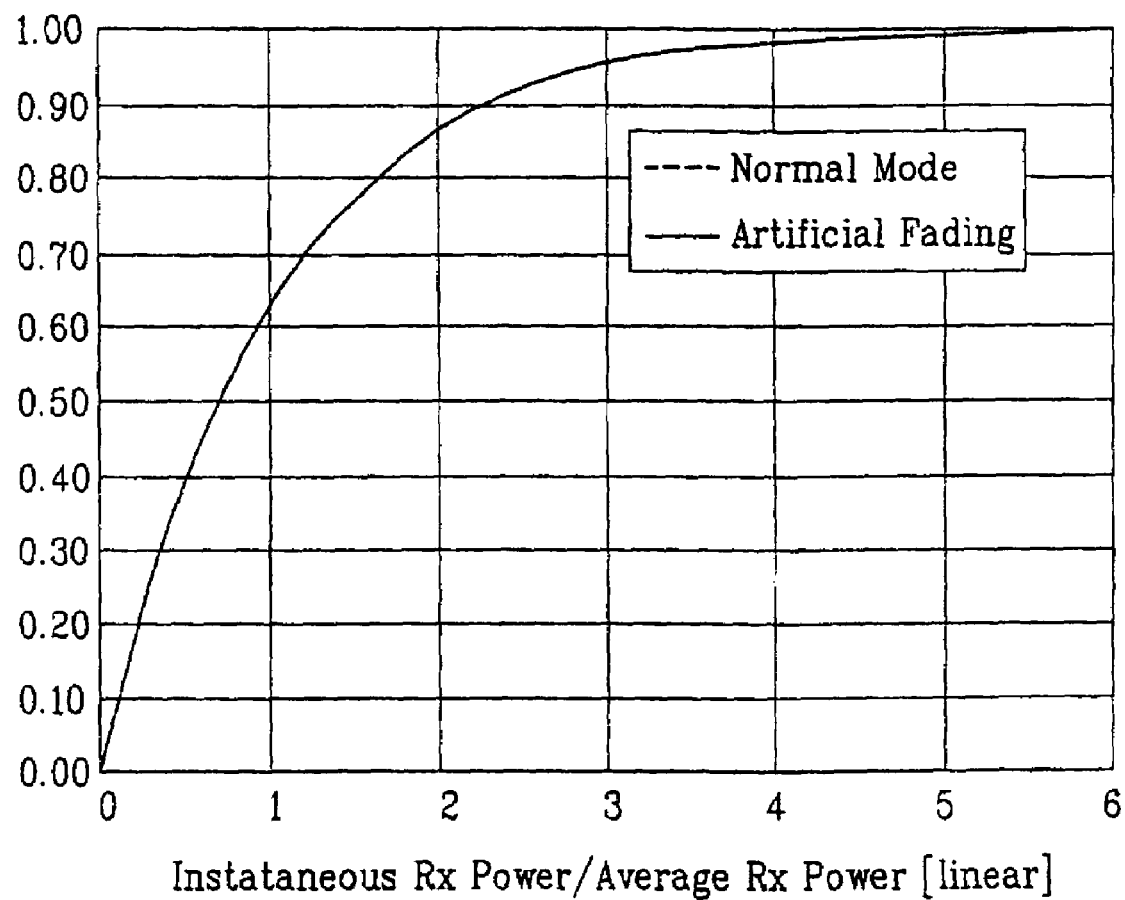

FIG. 1 is a graph of a cumulative distribution function on Gaussian channel in a related art and the present invention, FIG. 2 is a graph of a cumulative distribution function on Rician channel in a related art and the present invention, and FIG. 3 and FIG. 4 are graphs of a cumulative distribution function on Rayleigh channel in a related art and the present invention.

The results of the cumulative distribution function on the Gaussian and Rician channels in FIG. 1 and FIG. 2, respectively indicate channels statuses in fixed locations such as home, office, and the like. The cumulative distribution function on Rayleigh channel in FIG. 3 indicates a channel status on walking or traveling. Compared to the case of using one antenna (normal mode), the case of using two antennas (artificial fading) shows the better channel status in the fixed locations such as home, office, and the like.

Accordingly, the present invention has the following advantages or effects.

First of all, the proportional fair algorithm of a high speed data system is serviced when the channel status of the mobile terminal becomes favorable.

In case of the mobile terminal in Rician or AWGN (Gaussian) status, there exists an area where instantaneous reception power increases owing to the diversity effect, whereby the corresponding service can be provided at data rate, which is higher than that of the case of no diversity, by the scheduling algorithm.

When the base station enables to use at least one transmission (Tx) antenna, the mobile terminal enables to acquire transmission diversity (tx diversity) within the range that specifications are not changed. Hence, the base station provides the mobile terminal in optimal status with the packet service at high data rate, thereby enabling to increase its throughput.

However, this invention will be able to apply regardless of the number of the reception (Rx) antenna. For that reason, the structural modification of the reception (Rx) antenna is not required.

Further, even if a receiving side is not award what value are the phase-shifted and/or a variation frequency, it will be possible to receive normally the transmitted signal in a receiving side.

Further, it is preferable to determine that the variation frequency has less value within pre-determined rage according to the channel situation.

For the forgoing, the present invention is applied to the packet data service using time division.

Moreover, the mobile terminal can be provided with the service at high data rate as well.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A transmission diversity method in a communication system, comprising:
    presetting phase shifts of transmission signals; and
    transmitting the transmission signals through multiple antennas with phases that differ from one another based on said phase shifts, wherein a phase shift value of a transmission signal transmitted using a first antenna is varied at a frequency different from a phase shift value of a transmission signal transmitted using a second antenna to within a predetermined frequency.

2. The method of claim 1, wherein the phases of the transmission signals vary according to time t.

3. The method of claim 2, wherein the phase of a transmission signal transmitted using a first antenna and the phase of a transmission signal transmitted using a second antenna are phase-shifted with different variable cycles, respectively.

4. The method of claim 3, wherein the transmission signal of the second antenna is phase-shifted within a variation frequency of 5 Hz in contrast to the transmission signal of the first antenna.

5. The method of claim 1, wherein the phases of the transmission signals are variable for a time t.

6. The method of claim 5, wherein, in varying according to the time t, the phases of the transmission signals have different initial values, respectively.

7. The method of claim 1, wherein a total strength of the transmission signals is set to equal to a transmission strength of a signal transmitted using one antenna.

8. The method of claim 1, wherein the phase shift value of the transmission signal transmitted using the first antenna is varied slower than the phase shift value of the transmission signal transmitted using the second antenna.

9. The method of claim 1, wherein said predetermined variation frequency is at most substantially 5 Hz.

10. The method of claim 1, further comprising:
   providing a mobile terminal with a packet service based on a proportional fair algorithm, said algorithm providing the packet service at a time when the mobile terminal attains a predetermined channel status; and
   transmitting the transmission signals through the first and second antennas with said different phases using the packet service.

11. The method of claim 10, wherein the proportional fair algorithm includes:
   computing a priority function $P_i(k)$ for the mobile terminal relative to other mobile terminals; and
   scheduling the mobile terminal when the mobile terminal achieves a largest priority function value corresponding to said predetermined channel status.

12. The method of claim 11, wherein the priority function is computed based on the following equation:

$$P_i(k) = \frac{DPR_i}{T_i(k)}$$

wherein $DPR_i$ corresponds to transmittable data rate of the mobile terminal i and $T_i(k)$ corresponds to fairness throughput for time slot $k$.

13. The method of claim 12, wherein fairness throughput $T_i(k)$ is computed by:
   determining whether the mobile terminal is scheduled at a time slot k−1; and
   computing $T_i(k)=w \cdot T_i(k)$ if the mobile terminal is not scheduled, and computing $T_i(k)=w \cdot T_i(k-1)+(1-w) \cdot N_i(k-1)$ if the mobile terminal is scheduled, wherein w is based on a window size and $N_i(k-1)$ corresponds to information bit number of a packet transmitted through time slot k−1.

14. The method of claim 13, further comprising:
   periodically updating the fairness throughput for time slot $k$.

15. The method of claim 10, wherein the proportional fair algorithm increases throughput of a base station transmitting the transmission signals as a number of mobile terminals handled by the base station increases.

* * * * *